United States Patent
Gray et al.

(10) Patent No.: US 7,313,310 B2
(45) Date of Patent: Dec. 25, 2007

(54) PLASMA DIRECTING BAFFLE AND METHOD OF USE

(75) Inventors: Charles B. Gray, Peoria, AZ (US); Stanislaw Kopacz, Phoenix, AZ (US); Michael D. Sardinha, Glendale, AZ (US); Barry M. Dorsten, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/137,972

(22) Filed: May 25, 2005

(65) Prior Publication Data
US 2006/0269203 A1      Nov. 30, 2006

(51) Int. Cl.
   *G02B 6/00*   (2006.01)
   *C03B 37/01*  (2006.01)
(52) U.S. Cl. .................. 385/134; 385/147; 65/436
(58) Field of Classification Search .......... 385/100, 385/134, 147; 65/436
   See application file for complete search history.

(56) References Cited

U.S. PATENT DOCUMENTS

| | | | |
|---|---|---|---|
| 4,402,993 A * | 9/1983 | Aisenberg et al. | 427/527 |
| 4,810,054 A * | 3/1989 | Shinbori et al. | 385/96 |
| 5,441,568 A | 8/1995 | Cho et al. | |
| 5,543,017 A | 8/1996 | Uchiyama et al. | |
| 5,961,772 A | 10/1999 | Selwyn | |
| 6,118,218 A | 9/2000 | Yializis et al. | |
| 6,245,192 B1 | 6/2001 | Dhindsa et al. | |
| 6,465,964 B1 | 10/2002 | Taguchi et al. | |
| 6,502,588 B2 | 1/2003 | Li et al. | |
| 6,546,938 B2 | 4/2003 | Selwyn et al. | |
| 6,613,394 B2 | 9/2003 | Kuckertz et al. | |
| 6,616,766 B2 | 9/2003 | Dunham | |
| 6,696,662 B2 | 2/2004 | Jewett et al. | |
| 6,805,952 B2 | 10/2004 | Chang et al. | |
| 6,837,966 B2 | 1/2005 | Nishimoto et al. | |
| 6,849,306 B2 | 2/2005 | Fukuda et al. | |
| 6,852,169 B2 | 2/2005 | Fazio et al. | |
| 2002/0037374 A1 | 3/2002 | Gherardi et al. | |
| 2003/0092278 A1 | 5/2003 | Fink | |
| 2003/0094135 A1 | 5/2003 | Komiya et al. | |
| 2003/0159782 A1 | 8/2003 | Brcka | |
| 2003/0228413 A1 | 12/2003 | Ohta et al. | |
| 2004/0146262 A1* | 7/2004 | Byrd et al. | 385/128 |

* cited by examiner

*Primary Examiner*—Kevin S. Wood
(74) *Attorney, Agent, or Firm*—McDonnell Boehnen Hulbert & Berghoff LLP

(57) ABSTRACT

The present invention provides an assembly that may be used to clean the external surfaces of fiber optic cable. The assembly includes a baffle housing, a plasma source, a cable guide, and brackets to position the baffle and plasma source. The baffle housing defines a plasma inlet, an outlet, a cable passageway, and a chamber, wherein the chamber is in fluid communication with the plasma inlet, the outlet, and the cable passageway. The plasma source is disposed so as to emit a plasma gas into the housing through the plasma inlet, into the chamber, and out of the housing through the outlet. The chamber is shaped so as to generate turbidity in the plasma gas therein thus the plasma gas contacts all surfaces of a fiber optic cable in the chamber. The assembly uses a plasma source that provides an air plasma gas at atmospheric pressure.

16 Claims, 4 Drawing Sheets

PLASMA DIRECTING BAFFLE AND METHOD OF USE

FIELD OF THE INVENTION

The present invention relates to plasma directing baffles. More particularly the invention relates to methods and materials for use in directing an atmospheric pressure plasma gas in a surface modification process of fiber optic cable.

BACKGROUND OF THE INVENTION

Fiber optic cable is typically manufactured so as to include an outer buffer coating. The buffer coating is typically a polyamide or other polymer material. The buffer coat, in one aspect, protects the interior of the fiber optic cable from damage while providing a good surface that allows further processing of the cable. The buffer coat also may include additives that provide UV protection to the fiber optic cable.

Further manufacturing steps with fiber optic cable often require a processing of the buffer coat. For example, fiber optic cable may be subject to an inking step. The inking step, which is somewhat similar to wire inking in the semiconductor industry, involves applying a precured adhesive to the exterior surface of the cable. The manufacturing term "inking" is popularly used because of the color of the fluid applied to the cable. Later, the fiber optic cable with the adhesive coat is cured. Upon curing the adhesive bonds the cable into a desired configuration. In one application, inked fiber optic cables are wound and then bound into a spool-like shape. This configuration allows long lengths of fiber optic cable to serve as an interferometer in applications such as a fiber optic gyroscope (FOG).

It has been found that the inking (adhesive application) of fiber optic cable is improved if the cable exterior is first cleaned. While not wishing to be bound to any theory, it is believed that additives in the buffer coat, including UV protective additives, may partially leach out of the buffer coat. This leachant can interfere with the inking process. Previously, a cleaning step was performed by running fiber optic cable through an acetone bath. This kind of procedure is disadvantageous for several reasons. These reasons relate to the nature of acetone which may require certain procedures for safe handling, storage, and disposal. It would be desired to clean fiber optic cable with a process that avoids the use of chemicals such as acetone.

Hence there is a need for a general method to clean fiber optic cable quickly and easily. Further, there is a need for a cleaning method that avoids the use of potentially harmful chemicals. The method should be suitable with existing equipment used in the processing of fiber optic cables. Additionally, the cleaning of fiber optic cable should also allow the application of adhesive to the cable so that the cable may be subsequently cured into a desired configuration. The present invention addresses one or more of these needs.

SUMMARY OF THE INVENTION

The present invention provides a plasma directing baffle and assembly that may be used to clean fiber optic cable. In one embodiment, and by way of example only, there is provided a baffle for directing a plasma gas that includes a first surface defining a plasma inlet, a second surface defining an outlet, a third surface defining a cable passageway, and a fourth surface defining a chamber. The chamber is in fluid communication with the plasma inlet, the outlet, and the cable passageway. The chamber, which may have a substantially cylindrical section and a substantially hemispherical section, is further shaped so as to generate turbidity in the plasma gas that enters the chamber. The baffle may further have an interior region and an exterior region, and the plasma inlet may be shaped such that plasma gas passes from the exterior region of the baffle into the chamber. Further the chamber and the outlet may be shaped such that plasma gas passes from the chamber through the outlet to the exterior region of the baffle.

In a further embodiment, still by way of example only, there is provided an assembly for cleaning fiber optic cable that includes a baffle and plasma source. The baffle defines a plasma inlet, an outlet, a cable passageway, and a chamber, wherein the chamber is in fluid communication with the plasma inlet, the outlet, and the cable passageway. The plasma source is disposed so as to emit a plasma gas into the baffle through the plasma inlet, into the chamber, and out of the baffle through the outlet. The assembly may further include a tube guide disposed in the cable passageway so as to admit fiber optic cable into the chamber. The plasma gas may be an air plasma gas at atmospheric pressure. The chamber is shaped so as to generate turbidity in the plasma gas that enters the chamber.

In still a further embodiment, and still by way of example only, there is provided a method for providing a surface treatment of a fiber optic cable that includes the steps of drawing a fiber optic cable through a chamber of a baffle and directing a plasma gas into the chamber of the baffle so that a turbid plasma gas surrounds the fiber optic cable in the chamber. The step of drawing a fiber optic cable through a chamber may further comprise drawing the fiber optic cable at a rate of between about 0.1 to about 5.0 meter/second. A cable guide may be positioned within the plasma baffle so that fiber optic cable exits the cable guide at a point below where plasma gas enters the chamber of the baffle.

Other independent features and advantages of the plasma directing baffle will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
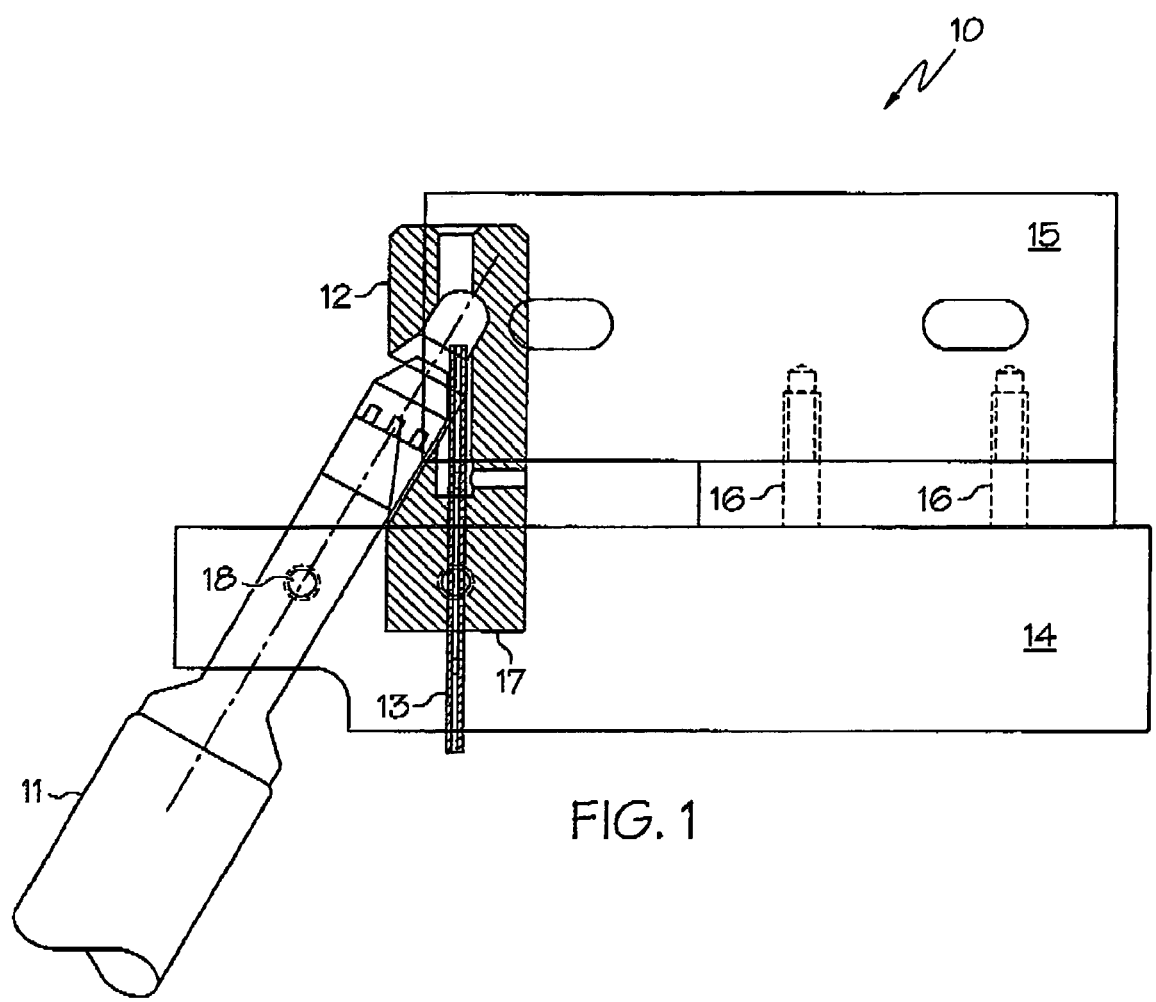
FIG. 1 is a partial cross sectional view of a plasma processing assembly for surface treatment of fiber optic cable according to an embodiment of the present invention.

Referring now to FIG. 1 there is shown a partial cross sectional view of a plasma processing assembly 10. The plasma processing assembly 10 includes plasma source 11, plasma baffle 12, and cable guide 13. Other useful equipment includes lower bracket 14 and upper bracket 15 that may be used to position baffle 12 and plasma source 11. As described further herein, the assembly of FIG. 1 can be used to clean fiber optic cable. The baffle 12 receives plasma gases from plasma source 11. The baffle 12 causes turbidity in the plasma gases such that the plasma gases then clean the surface of the fiber optic cable on all surfaces as the cable passes through baffle 12.

Figure 2:
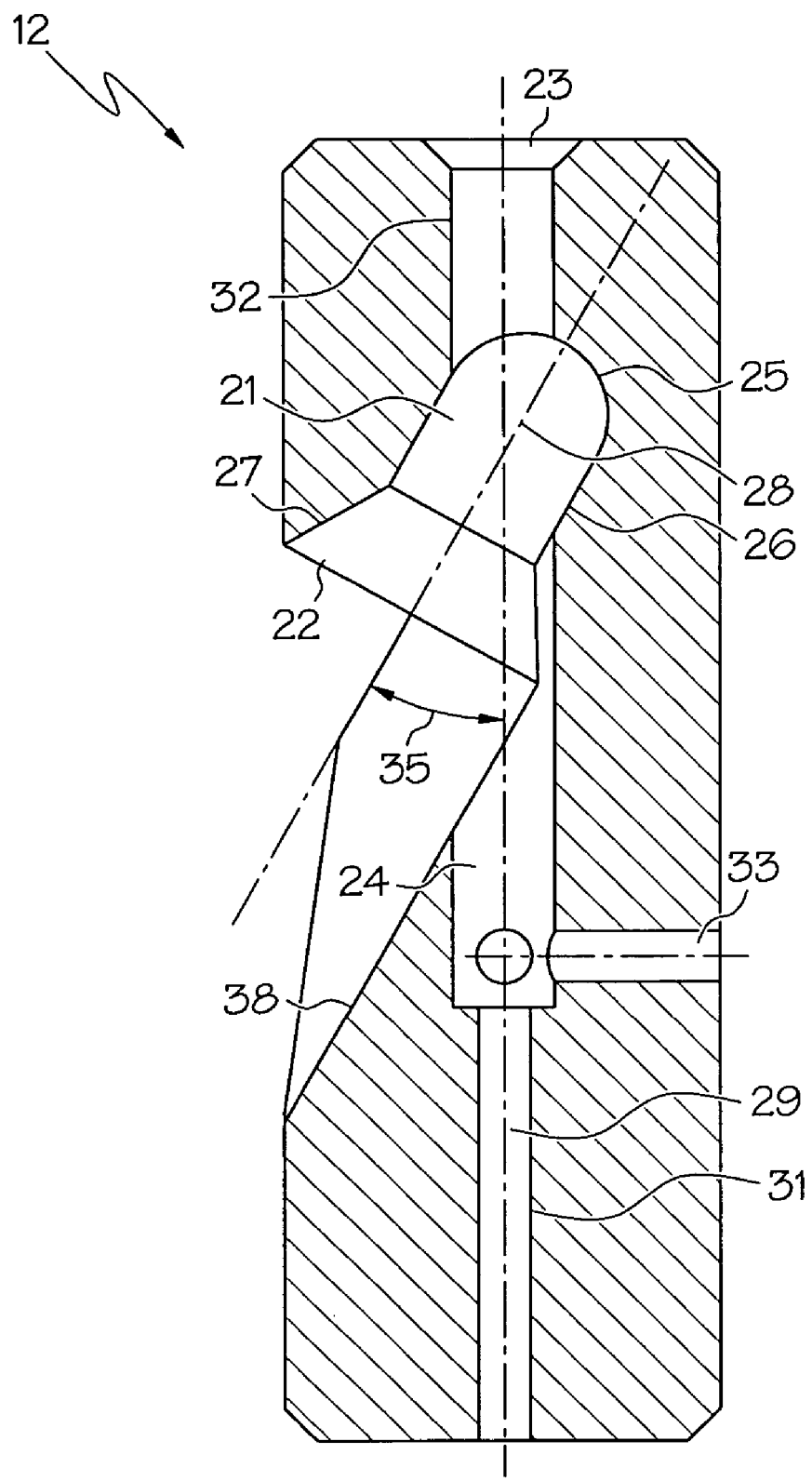
FIG. 2 is a cross sectional view of a plasma baffle according to an embodiment of the present invention.
Figure 3:
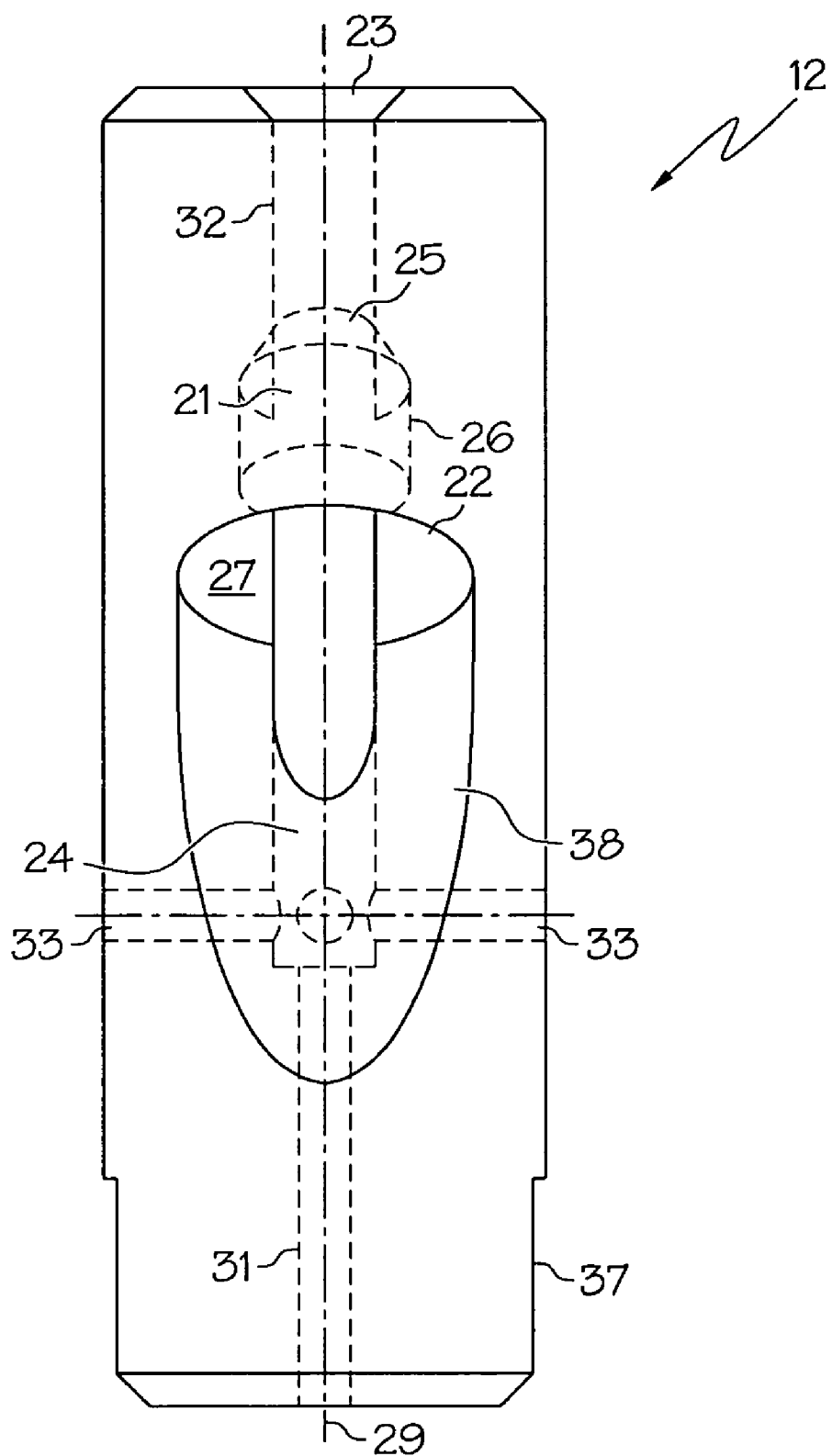
FIG. 3 is a further cross sectional view of a plasma baffle according to an embodiment of the present invention.

Referring now to FIGS. 2 and 3 an embodiment of plasma baffle 12 is shown that includes various hollow areas and surfaces. In FIG. 2 plasma baffle 12 defines chamber 21, plasma inlet 22, outlet 23, and cable passageway 24. Each of chamber 21, plasma inlet 22, outlet 23, and cable passageway 24 is defined by surfaces of the baffle material as further described herein. Each of plasma inlet 22, outlet 23, and cable passageway 24 is in fluid communication with chamber 21. Plasma inlet 22, outlet 23, and cable passageway 24 further provide fluid communication between the exterior of plasma baffle 12 and chamber 21. In one embodiment plasma baffle 12 is machined so as to create chamber 21, plasma inlet 22, outlet 23, and cable passageway 24. In an alternative embodiment, baffle 12 is cast to include one or more of these spaces.

Still referring to the embodiment shown in FIG. 2 and FIG. 3 chamber 21 preferably includes a hemispherical or substantially hemispherical chamber surface 25 linked with a cylindrical or substantially cylindrical chamber surface 26. Hemispherical chamber surface 25 and cylindrical chamber surface 26 are shown to be aligned along chamber axis 28. It will be appreciated that the shapes of the surfaces described above may vary.

Inlet 22 is preferably defined at least in part by a frustoconical surface 27. Inlet 22 is also aligned along the same axis 28 as is chamber 21. Frustoconical surface 27 may connect with cylindrical chamber surface 26. The frustoconical shape is preferred as it matches a corresponding surface of a preferred plasma source 11. Other shapes are possible. If, for example, a plasma source 11 is utilized that has a tip shape other than a frustoconical shape, it may be desired to shape the inlet surface 27 so as to match that different shape. Inlet 22 is further shaped so as to direct plasma gas from plasma source 11 through inlet 22 and into chamber 21.

Cable passageway 24 is shown in a preferred embodiment to include two sections, tube guide section 31 and cleaning section 32. Tube guide section 31 and cleaning section 32 are preferably defined by cylindrical or substantially cylindrical surfaces, though other surface shapes are possible. Further, tube guide section 31 and cleaning section 32 are aligned along cable passageway axis 29.

Tube guide section 31 is preferably shaped and dimensioned so as to receive cable guide 13 therein. Further, tube guide section 31 should allow axial movement therein of cable guide 13 so that cable guide 13 can be placed at a selected position relative to chamber 21.

Plasma baffle 12, in a further embodiment, includes draw holes 33. Draw holes 33 are generally positioned so as to provide fluid communication between the exterior of baffle 12 and cable passageway 24. A preferred number of draw holes 33 is three, shown in FIG. 2 and FIG. 3 separated at approximately 90 degree angles. However, other numbers and positions of draw holes 33 are possible. Draw holes 33 are preferably drilled into baffle 12 such that the drilling creates the surfaces that define each draw hole. Draw holes 33 are thus approximately cylindrical in shape; however, other shapes are possible.

Plasma baffle 12 is preferably fabricated from a matrix of ceramic material. One acceptable ceramic is commonly referred to as machinable ceramic or machinable glass ceramic. Machinable ceramic produced by Corning Glass and sold under the trade name MACOR® machinable ceramic is an acceptable machinable ceramic for use as a matrix material for baffle 12. MACOR® machinable ceramic is a fluorine rich glass with a composition approaching trisilicic fluorphlogopite mica ($KMg_3AlSi_3O_{10}F_2$). In the fabrication of MACOR® machinable ceramic, a controlled heat treatment devitrifies fluorine rich droplets in an originally cast material thus causing a series of morphological changes ultimately resulting in the formation of randomly oriented, interlocked, sheet-like fluorphlogopite mica crystals within an alumino-borosilicate glass matrix. The volume percent crystalline phase after heat treatment is approximately 55% with a mean crystal size of approximately 20 microns. A uniform distribution of randomly oriented mica within the parent glass gives rise to desirable characteristics of MACOR® machinable ceramic.

Plasma baffle 12 may be configured to have any exterior shape. It has been found preferable to shape the baffle to be generally cylindrical for ease of handling, and for material savings. As shown in FIG. 3 baffle 12 may include flats 37 for fitting baffle 12 in a reciprocally fitted slot formed in the lower bracket 14. Additionally, plasma baffle 12 may include resting surface 38 on which a portion of plasma source 11 can rest.

Plasma source 11 generates a plume of plasma gases. Plasma gases flow at any rate, though rates of less than 1000 liter/hour are preferred. Plasma source 11 preferably comprises an atmospheric pressure plasma generator, though other pressures are acceptable. Additionally, it is preferred that plasma source 11 generate a plasma gas plume from ambient air, though other kinds of plasma may be used. One supplier of such a plasma source 11 is Tepla America which sells a product under the trade name PLASMA PEN® plasma generator. The PLASMA PEN® plasma generator provides an air plasma at ambient pressures. This plasma source 11 can operate from a US standard 120 V/60 Hz electrical power outlet. It further operates with a source of dry air supplied at approximately 6 bar pressure. The PLASMA PEN® plasma generator can operate with air flow rates up to approximately 1000 l/hr. The method described herein can operate with other kinds of plasma sources.

Figure 4:
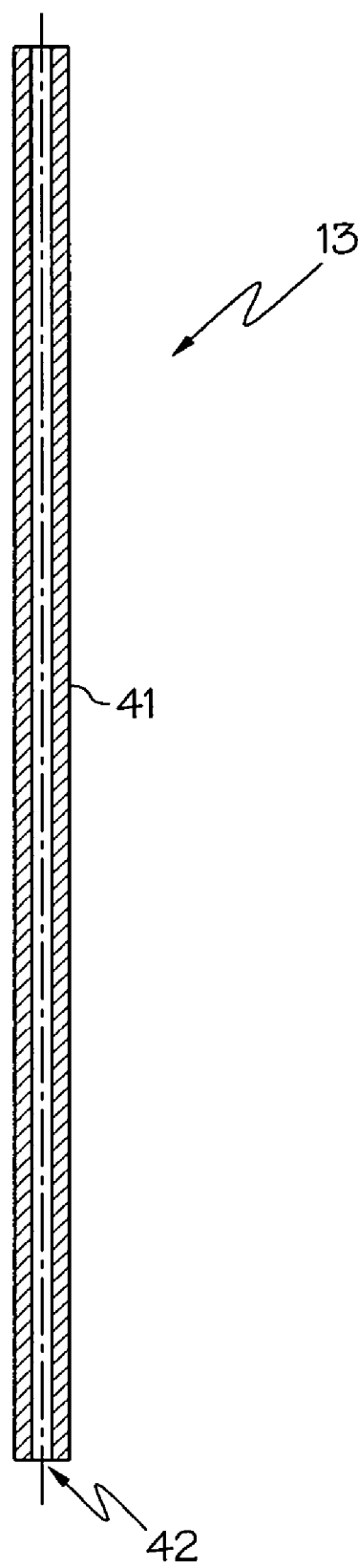
FIG. 4 is a cross sectional view of a cable guide according to an embodiment of the present invention.

A preferred embodiment of cable guide 13 is shown in FIG. 4. Cable guide 13 is a generally cylindrical tube through which fiber optic cable may pass. Cable guide 13 is further configured with an outer cylindrical surface 41 so as to be able to slide within cable passageway 24. Cable guide 13 also includes a hollow cylindrical interior 42. Preferably cable guide 13 is sized in its internal diameter so that a desired fiber optic cable can pass therethrough with minimal friction resistance. In a further preferred embodiment, cable guide 13 has a sufficiently large internal diameter so that it can accommodate many of the common fiber optic cable diameters. For example, cable guide 13 may be sized so as to pass cables with diameters varying from about 100 to about 400 microns. It is generally preferred to fabricate cable guide 13 from alumina ceramic.

Having described the plasma directing baffle and apparatus from a structural standpoint, a method of using the plasma directing baffle will now be described.

Plasma source 11 may be brought into proximity with baffle 12 such that frustoconical surface 27 contacts plasma source 11. Alternatively, plasma source 11 may be disposed in proximity with baffle 12 but without contacting baffle 12. A contact between plasma source 11 and baffle 12 does provide a way of confirming that plasma source 11 is disposed in a desired position with respect to baffle 12. The contact further provides an additional function in directing the flow of plasma gas.

The contact (or proximity) between plasma source 11 and baffle surface 12, while not air tight, is nevertheless a degree of contact (or proximity) so as to partially restrict the outflow of plasma gas therethrough. Outlet 23 is sized so that plasma gas generally exits from chamber 21 through outlet 23. Thus, the contact between baffle 12 and plasma source 11 is such that plasma gas is caused to turbidly swirl within chamber 21 before leaving chamber 21 through outlet 23.

Further, the shape of chamber 21 promotes turbidity in the plasma gas that enters chamber 21. Plasma gas that leaves plasma source 11 is preferably already in turbulent, non-laminar flow. As plasma gases enter chamber 21, the gases will come into contact with a surface of chamber 21. The hemispherical chamber surface 25 acts to reflect the gases back into the interior of chamber 21. Given the curved shape of hemispherical chamber surface 25, the reflected gases move in a variety of directions. The collision of reflected gases with gases entering chamber 21 further acts to disperse the gases in varying directions. However, as described before, plasma gases are partially restricted from leaving chamber 21 except through outlet 23. Cylindrical chamber surface 26 also restricts the movement of plasma gases. Thus, during the time that a gas molecule resides within chamber 21, it moves in a variety of random directions characterized by turbidity.

In FIG. 2 plasma baffle 12 is shown such that cable passageway axis 29 is set at an angle 35 relative to chamber axis 28. Thus, in FIG. 1, when plasma source 11 engages with baffle 12, plasma source 11 is placed so as to contact, or come into proximity with, frustoconical surface 27 thereby aligning along chamber axis 28. While the angle 35 may vary (even to include normal angles), it is preferred that an acute angle, rather than normal, configuration be followed. The angled approach promotes the flow of plasma gases through chamber 21 and then through outlet 23. This flow of plasma gases further induces the venturi effect which draws air through draw holes 33.

In operation, draw holes 33 allow air from the exterior of baffle 12 to be drawn through draw holes 33 and into cable passageway 24 and through the cable passageway 24 to chamber 21. It is noted that draw holes 33 are positioned at the cleaning section 32 of cable passageway 24. There is some small clearance between the exterior surface 41 of cable guide 13, when positioned within cable passageway 24, and cleaning section 32 so as to allow the flow of air from draw holes 33 toward chamber 21. This air flow further promotes turbidity in chamber 21.

Fiber optic cable that is to be cleaned is threaded into cable guide 13. Cable guide 13 is placed within tube guide section 31 and positioned so that cable exits cable guide 13 at a desired position. In one embodiment, cable exits cable guide 13 just below the point within chamber 21 where plasma gas enters chamber 21. Cable, passing through cable passageway 24, and out of baffle 12 through outlet 23 is gathered up by collecting equipment (not shown). Equipment, which is not shown, to move the fiber optic cable as described may include motors, spools, guides, tensioners, and pulleys. As will be understood by those skilled in the art, fiber optic cable is unspooled, run through baffle 12, and then subject to further processing such as inking. After cleaning and inking the cable may also be respooled.

As cable passes through chamber 21, cable is exposed to plasma gas. Further, a section of cable is exposed to plasma gas for a dwell time. The dwell time will be determined by factors such as the size of chamber 21 and the linear travel rate of cable. Cable then passes out of chamber 21 through outlet 23. The turbid plasma plume surrounds cable while in chamber 21. Thus plasma gases impinge on all points of cable while cable passes through chamber 21. Cable is preferably centered so that it passes through a midpoint of chamber 21. In this manner, all points on the generally cylindrical surface of cable can be in contact with a generally equal volume of gases.

A combination of baffle size, gas flow volume, gas turbidity, and cable throughput rate allows substantially all points of the cable to come into contact with plasma gas during the cable dwell time. Further the length of contact between plasma gas and the surface of the fiber optic cable is such so as to allow a desired cleaning of the fiber optic cable. It will be appreciated that a longer dwell time generally allows for a greater level of cleaning, assuming a constant gas flow rate. A typical throughput rate for fiber optic cable is between about 0.1 meter/second to about 5.0 meter/second. More preferably, a throughput rate is between about 0.5 m/s to about 1.5 m/s.

Referring again to FIG. 1, there is shown an assembly wherein baffle 12 is positioned with respect to an upper bracket 15 and lower bracket 14. Brackets 14 and 15 allow for a general positioning of baffle 12 and plasma source 11. Lower bracket 14 may include a recess 17 for receiving baffle 12. Upper bracket 15 may further include a receiving surface (not shown) for firmly engaging baffle 12. Lower bracket 14 may additionally include a means for locking plasma source 11 in a desired location, such as locking pin 18. Brackets 14 and 15 may further include an adjustable positioning means 16 that allows for the relative positioning of the brackets. An adjustable positioning means 16 may take several forms such as, but not limited to, clamps and gears. Those skilled in the art will recognize that baffle 12 and plasma source 11 may be positioned in a variety of manners, with the manner illustrated being but one suggested way of positioning the components.

While not wishing to be bound by any theory, it is suggested that the cleaning of the fiber optic cable occurs through a chemical reaction between oxygen in the plasma gas and reactants on the surface of the fiber optic cable. Organic impurities, for example, are believed to react with the plasma gas in a combustion reaction. The product of the combustion reaction is carried away in the plasma gas effluent. A sufficiently long dwell time may also allow a degree of reaction between the plasma gas and the polymer material of the buffer layer. However, in a preferred embodiment, the polymer material of the buffer layer is not significantly reacted such that the performance of the buffer layer would be significantly degraded below its manufactured condition. However, in an alternative embodiment, the buffer layer may be reacted, even to the point of being substantially eliminated, by the plasma gas.

It will be appreciated that one advantage of the above described embodiments is that turbid plasma gases impact fiber optic cable from substantially all directions relative to the surface of the cable. Thus, unlike systems without baffle 12, the present embodiments allow for substantial contact between plasma gases and the surface of fiber optic cable. Further, the above described embodiments allow the use of a plasma gas generated from ambient air and ambient pressures. No complicated gas handling equipment systems are necessary. If desired, the plasma gas effluent can be discharged to the surrounding atmosphere without collection or further treatment.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A baffle for directing a plasma gas comprising:
   a first surface defining a plasma inlet, the inlet having an axis of symmetry;
   a second surface defining an outlet;
   a third surface defining a cable passageway; and
   a fourth surface defining a chamber, the chamber in fluid communication with the plasma inlet, the outlet, and the cable passageway, the chamber having an axis of symmetry that is coincident with the axis of symmetry of the inlet.

2. The baffle according to claim 1 wherein the baffle has an interior region and an exterior region;
   wherein the plasma inlet is shaped such that plasma gas passes from the exterior region of the baffle into the chamber; and
   wherein the chamber and the outlet are shaped such that plasma gas passes from the chamber through the outlet to the exterior region of the baffle.

3. The baffle according to claim 2 wherein the chamber is shaped so as to generate turbidity in the plasma gas that enters the chamber.

4. The baffle according to claim 1 wherein the cable passageway is shaped so as to direct fiber optic cable through the cable passageway, into the chamber, and out of the baffle through the outlet.

5. The baffle according to claim 1 wherein the chamber comprises a substantially cylindrical section and a substantially hemispherical section.

6. The baffle according to claim 1 further comprising a fifth surface defining an air draw hole in fluid communication with the cable passageway.

7. The baffle according to claim 1 wherein the plasma inlet and the chamber are aligned so as to promote a venturi effect when plasma gas passes through the inlet and into the chamber.

8. The baffle according to claim 1 wherein the baffle comprises a machinable ceramic.

9. An assembly for cleaning a surface of a fiber optic cable comprising:
   a baffle defining a plasma inlet, an outlet, a cable passageway, and a chamber comprising a hemispheric portion and a cylindrical portion, wherein the chamber is in fluid communication with the plasma inlet, the outlet, and the cable passageway; and
   a plasma source disposed so as to emit a plasma gas into the baffle through the plasma inlet, into the chamber, and out of the baffle through the outlet.

10. The assembly according to claim 9 wherein the chamber is shaped so as to generate turbidity in the plasma gas.

11. The assembly according to claim 9 further comprising a tube guide disposed in the cable passageway so as to admit fiber optic cable into the chamber.

12. The assembly according to claim 9 wherein the plasma gas comprises an atmospheric pressure plasma gas.

13. The assembly according to claim 9 wherein the plasma gas comprises an air plasma gas.

14. The assembly according to claim 9 wherein the plasma source provides a flow of air plasma gas at a rate of up to approximately 1000 liter/hour.

15. The assembly according to claim 9 further comprising at least one bracket disposed so as to place the plasma source in a selected position with respect to the baffle.

16. The assembly according to claim 9 wherein the baffle comprises a machinable ceramic.

* * * * *